United States Patent
vom Stein

(10) Patent No.: US 7,316,214 B2
(45) Date of Patent: Jan. 8, 2008

(54) COVER FOR TIGHTLY SEALING A DEVICE

(75) Inventor: Hans-Joachim vom Stein, Odenthal (DE)

(73) Assignee: AB SKF, Gothenburg (SE)

( * ) Notice: Subject to any disclaimer, the term of this patent is extended or adjusted under 35 U.S.C. 154(b) by 96 days.

(21) Appl. No.: 11/068,886

(22) Filed: Mar. 2, 2005

(65) Prior Publication Data

US 2005/0205033 A1    Sep. 22, 2005

(30) Foreign Application Priority Data

Mar. 2, 2004 (DE) ............... 10 2004 010 584

(51) Int. Cl.
*F01M 9/10* (2006.01)
(52) U.S. Cl. ............... 123/90.37; 123/90.38; 123/193.3
(58) Field of Classification Search ........... 123/90.37, 123/90.38, 198 E, 198 F, 193.3
See application file for complete search history.

(56) References Cited

U.S. PATENT DOCUMENTS

| 4,499,869 A | 2/1985 | Visek |
| 5,957,100 A * | 9/1999 | Frohwerk et al. ........ 123/90.38 |
| 6,691,667 B2 * | 2/2004 | Salameh .................. 123/195 C |
| 2002/0170775 A1 | 11/2002 | Vom Stein et al. |

FOREIGN PATENT DOCUMENTS

| DE | 1 601 380 | 1/1971 |
| DE | 20 51 346 | 6/1971 |
| DE | 26 38 982 A1 | 3/1978 |
| DE | 34 04 043 A1 | 8/1984 |
| DE | 101 19 892 C2 | 11/2002 |
| GB | 1 303 478 | 1/1973 |
| GB | 2328990 A * | 3/1999 |

OTHER PUBLICATIONS

German Office Action issued by the German Patent Office on Dec. 15, 2004 (with English translation). (Copies of the cited references have been filed on Mar. 2, 2005).

* cited by examiner

*Primary Examiner*—Ching Chang
(74) *Attorney, Agent, or Firm*—Buchanan, Ingersoll & Rooney PC

(57) ABSTRACT

A cover for tightly sealing a device comprises at least one elastomer part which is designed to fit tightly against a contact surface of a device, and another part which follows the elastomer part, with the elastomer part being arc-shaped in a transition area to the other part.

15 Claims, 2 Drawing Sheets

COVER FOR TIGHTLY SEALING A DEVICE

This application is based on and claims priority under 35 U.S.C. § 119 with respect to German Application No. 10 2004 010 584.7 filed on Mar. 2, 2004, the entire content of which is incorporated herein by reference.

FIELD OF THE INVENTION

The invention generally relates to a sealing device. More particularly, the invention pertains to a cap or cover for tightly sealing a device, wherein the cap or cover includes at least one elastomer part intended to fit tightly against a contact surface of the device and another part following the elastomer part.

BACKGROUND DISCUSSION

DE 101 19 892 C2 discloses one example of a cylinder head cover of an internal combustion engine. The cylinder head cover includes an elastomer part which is connected to a plastic cover-like part. For purposes of noise suppression, another cover element is provided over the elastomer and the cover-like part.

SUMMARY

A cover for tightly sealing a device comprises an elastomer first part possessing a portion adapted to fit tightly against a contact surface of the device and at least one stiffening element in the elastomer part. The elastomer first part comprises a transition area that transitions into a second part, with the transition area at which the elastomer first part transitions to the second part being arc-shaped over at least a portion of its length.

According to another aspect, a cylinder head cover used in connection with an internal combustion engine to tightly seal a contact surface of the internal combustion engine comprises an elastomer part having one portion adapted to fit tightly against the contact surface of the internal combustion engine and at least one stiffening element embedded in the elastomer part. The elastomer part also comprises an upstanding transition area connected to a plastic cover part, with the transition area comprising at least one region of curvature so that the plastic cover part is horizontally offset from a part of the upstanding transition area.

BRIEF DESCRIPTION OF THE DRAWING FIGURES

The foregoing and additional features, characteristics and details will be understood from the following detailed description considered with reference to the accompanying drawing figures in which like elements are designated by like reference numerals.

DETAILED DESCRIPTION

Figure 1:
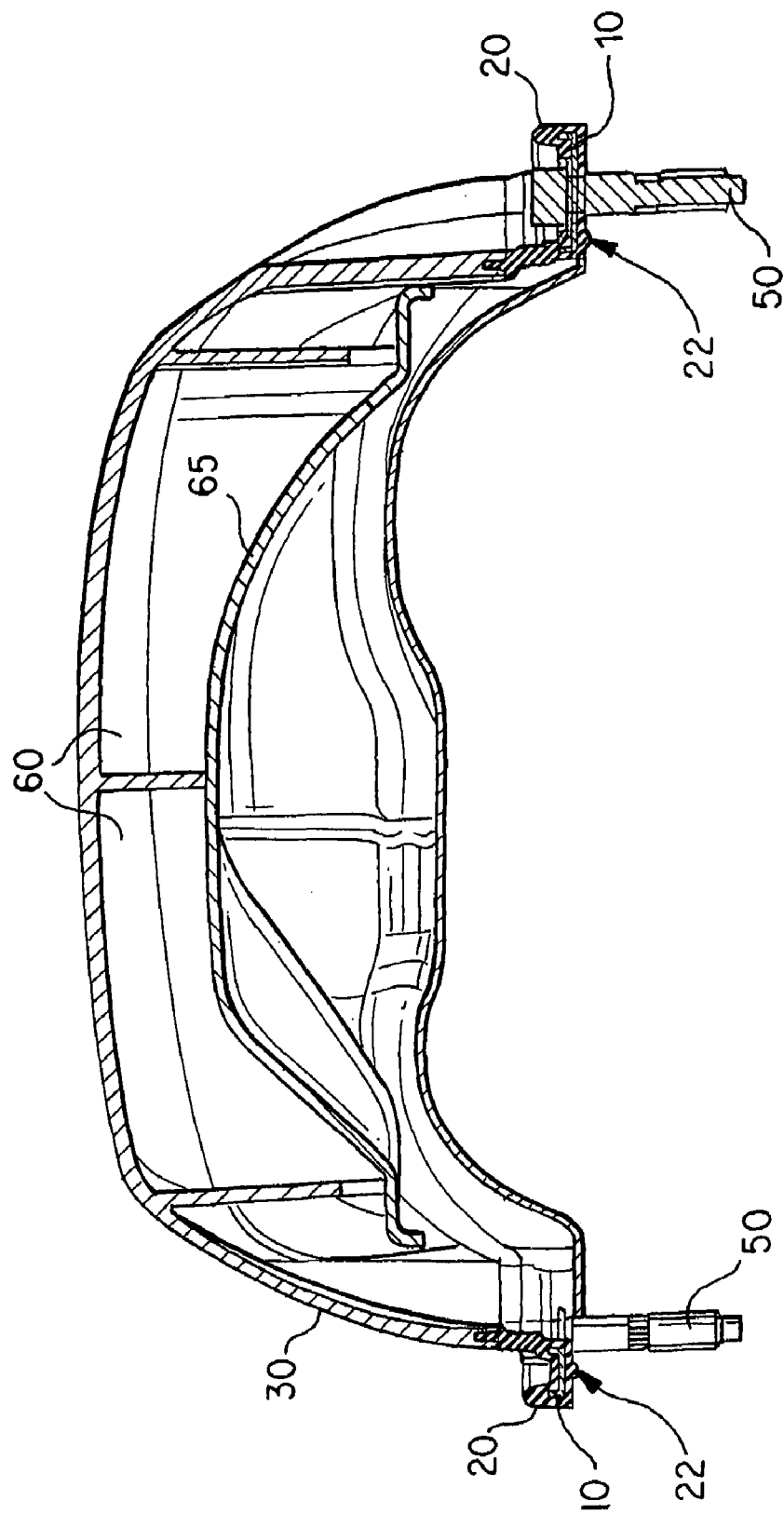
FIG. 1 is a cross-sectional view of a cylinder head cover or cap.

FIG. 1 illustrates in cross-section one embodiment of a cylinder head cover or cap. The cylinder head cover comprises an elastomer part 20 which extends peripherally like a frame, with a sealing lip 22, for tightly adjoining the contact surface of an internal combustion engine. A stiffening element 10 is embedded or provided within the elastomer part 20. The stiffening element 10 likewise runs or extends peripherally like a frame and has a roughly U-shaped cross-section or profile. The stiffening element 10 is composed of several sheet metal stampings.

During manufacture, the stiffening element 10 is coated with an adhesive and the elastomer part 20 is then molded onto the stiffening element 10 by an injection molding process. The elastomer part 20 comprises rubber or silicone. Furthermore the elastomer part 20 and the stiffening element 10 are provided with openings or holes through which the cylinder head cover can be attached to the contact surface via fasteners such as screws 50 as illustrated by way of example in FIG. 1.

Adjoining the elastomer part 20, the cylinder head cover furthermore comprises a cover-like part 30 of plastic. The elastomer part 20 is connected to the cover-like part 30 by virtue of the elastomer part 20 being molded into a U-shaped groove 32 of the cover-like part 30. The upper area of the cylinder head cover includes function spaces 60 for oil separation which are bordered to the bottom by a bottom element 65 of the cylinder head cover. The elastomer part 20 and the cover-like part may be fabricated from different materials.

Figure 2:
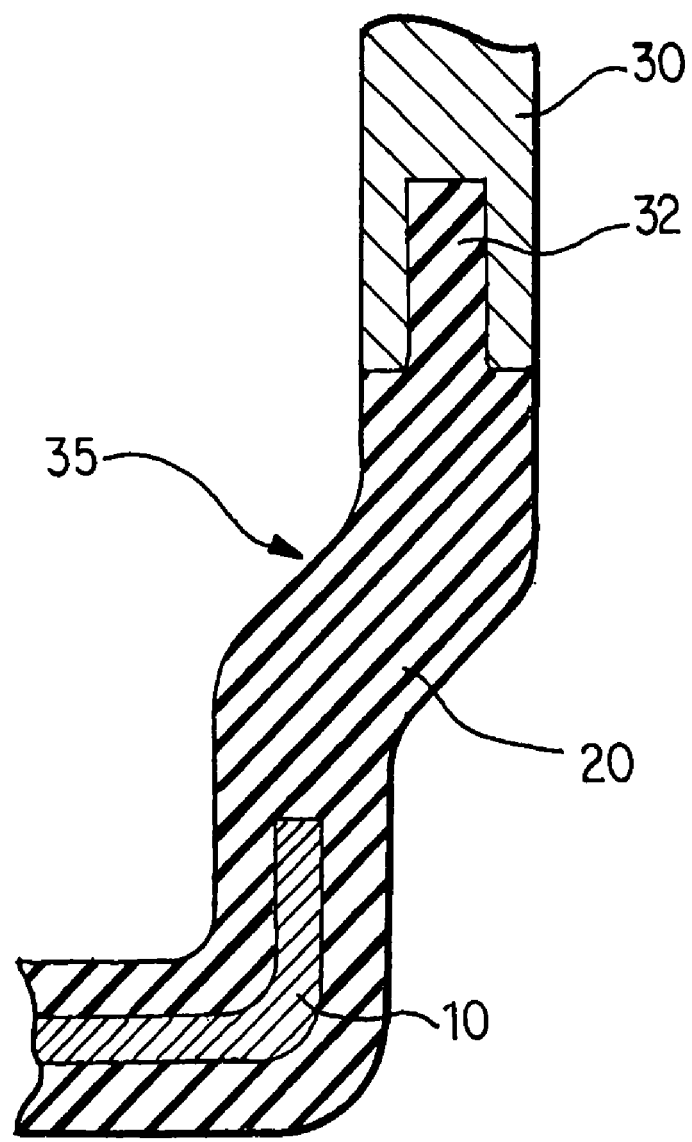
FIG. 2 is an enlarged cross-sectional view of a portion of the cylinder head cover depicted in FIG. 1, illustrating the transition area between the elastomer part and the cover-like part of the cylinder head cover.
Figure 2:
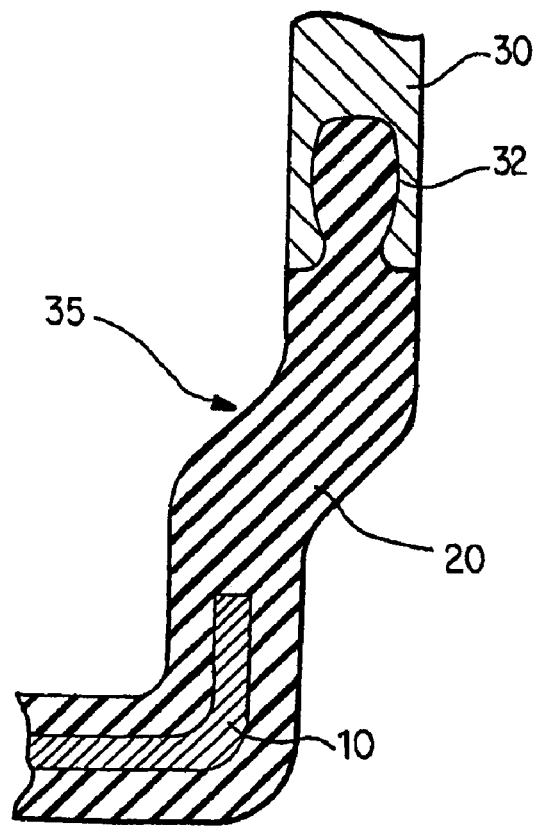

FIG. 2 illustrates on an enlarged scale the transition area 35 of the elastomer part 20 toward the cover-like part 30. As can be seen, the generally U-shaped groove 32 of the cover-like part 30 is configured to be undercut, with the elastomer part 20 positively engaging the groove 32. Thus the groove 32 is configured to be somewhat O-shaped and tapering toward the opening. That is, the groove 32 is configured to possess a somewhat rounded dove-tail shaped configuration in which the size of the groove near the opening is smaller than the portion of the groove farthest away from the opening, with the portion of the elastomer part positioned in the groove 32 being similarly configured. The elastomer part 20 smoothly continues the outer surface of the cover-like part 30 as shown in FIG. 2.

The transition area 35 of the elastomer part 20 is shaped to possess at least one arc-shaped component or region of curvature. In the illustrated embodiment, the transition area 35 comprises two arc-shaped component areas or regions of curvature which directly adjoin one another and have different curvatures. The transition area thus possesses, in the illustrated embodiment, at least two arc-shaped component areas which are different from one another, with one of the component areas curved to one side (e.g., the left) and the other of the component areas curved to the opposite side (e.g., the right). The transition area 35 is thus S-shaped or corrugated in the illustrated embodiment.

Also, the transition area 35 extends in a direction perpendicular to the contact surface over a length of at least a few millimeters, preferably several millimeters to a few centimeters. The transition area 35 more preferably possesses a length from 2 mm to 5 cm. The arcs in the transition area 35 possess a radius from a few millimeters to several millimeters, preferably, 2 mm to 20 mm.

This configuration of the transition region results in a horizontal offset between the lower part of the cover-like part 30 and the lower part of the elastomer part 20. The spring characteristics of the transition area 35 can be adjusted in a definable manner, especially by choosing the vertical height of the transition area together with the extent of the horizontal offset caused by the transition area. The spring characteristic may be set such that the vibrations of the remaining elastomer part 20 which are expected during operation are kept away as completely as possible from the cover-like part 30 by corresponding decoupling.

The cover or cap disclosed here possesses good noise suppression properties and is able to tightly seal a device, yet is relatively simple in structure. Because the elastomer part of the cover is arc-shaped in the transition area where the elastomer part transitions to the other part of the cover, different thermal lengthwise elongation is enabled between the elastomer part into which stiffening elements (e.g., sheet metal stampings forming a frame) can be integrated, and the other part (e.g., plastic part), without significant build-up of stress. In addition, relatively effective decoupling of solid-borne sound of the other part is achieved so that relatively good noise suppression can be realized without necessarily requiring another cover element. Also the spring characteristic of solid-borne sound decoupling can be influenced in a dedicated manner by modifications of the geometry of the arc-shaped transition area.

The principles, preferred embodiment and mode of operation have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

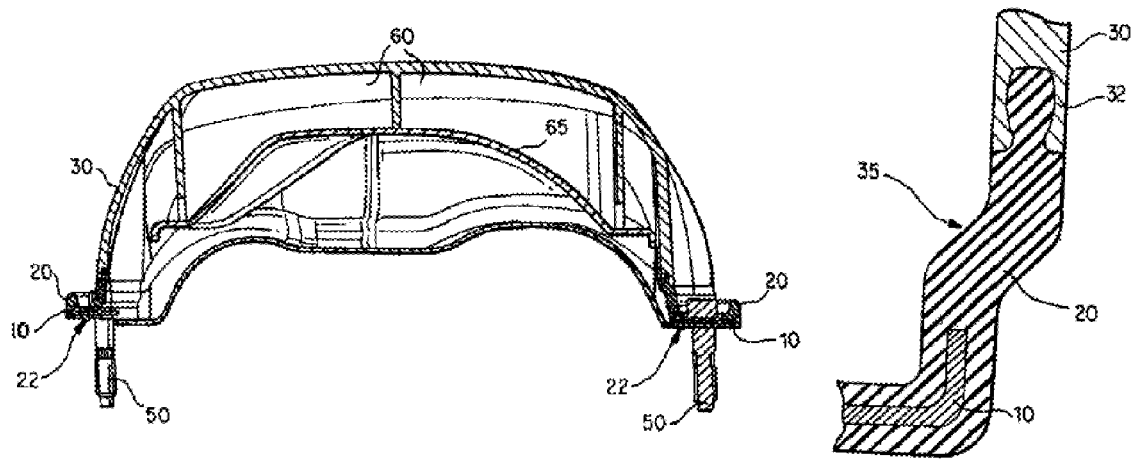

What is claimed is:

1. A cylinder head cover used in connection with an internal combustion engine to tightly seal a contact surface of the internal combustion engine, the cylinder head cover comprising an elastomer part having one portion adapted to fit tightly against the contact surface of the internal combustion engine and at least one stiffening element embedded in the one portion of the elastomer part, the elastomer part also comprising an upstanding transition area connected to a plastic cover part, the transition area being formed entirely of elastomer and comprising at least one region of curvature so that the plastic cover part is horizontally offset from a part of the upstanding transition area.

2. The cylinder head cover according to claim 1, wherein the at least one region of curvature comprises two component areas, including one component area curved to one side of the elastomer part and another component area curved to an opposite side of the elastomer part.

3. The cylinder head cover according to claim 1, wherein the transition area extends in a direction perpendicular to the contact surface over a length of at least a few millimeters.

4. The cylinder head cover according to claim 1, wherein the length of the transition area is from 2 mm to 5 cm.

5. The cylinder head cover according to claim 1, wherein the region of curvature of the transition area possesses a radius of 2 mm to 20 mm.

6. A cover for tightly sealing a device comprising an elastomer first part possessing a portion adapted to fit tightly against a contact surface of the device and at least one stiffening element in the portion of the elastomer part, the elastomer first part comprising a transition area that is formed entirely of elastomer and transitions into a second part, the transition area at which the elastomer first part transitions to the second part being arc-shaped over at least a portion of its length.

7. The cover according to claim 6, wherein the transition area has at least two arc-shaped component areas which are different from one another.

8. The cover according to claim 7, wherein the two arc-shaped component areas are arranged so that they directly follow one another.

9. The cover according to claim 7, wherein one of the two component areas is curved to one side of the elastomer first part and the other component area is curved to an opposite side of the elastomer first part.

10. The cover according to claim 6, wherein the transition area extends in a direction perpendicular to the contact surface over a length of at least a few millimeters.

11. The cover according to claim 6, wherein the length of the transition area is from 2 mm to 5 cm.

12. The cover according to claim 6, wherein the radius of the arc-shaped portion is 2 mm to 20 mm.

13. The cover according to claim 6, wherein the second part is made of plastic.

14. The cover according to claim 6, wherein the second part is a cover part.

15. The cover according to claim 14, wherein the cover part is a cylinder head cover for an internal combustion engine.

* * * * *

UNITED STATES PATENT AND TRADEMARK OFFICE
CERTIFICATE OF CORRECTION

| | | |
|---|---|---|
| PATENT NO. | : 7,316,214 B2 | |
| APPLICATION NO. | : 11/068886 | |
| DATED | : January 8, 2008 | |
| INVENTOR(S) | : Von Stein | |

It is certified that error appears in the above-identified patent and that said Letters Patent is hereby corrected as shown below:

Delete Title page illustrating figures, and substitute therefor, new Title page illustrating figures. (attached)

Delete drawing sheet 2, and replace with drawing sheet 2. (attached)

Signed and Sealed this

Twenty-sixth Day of August, 2008

JON W. DUDAS
*Director of the United States Patent and Trademark Office*

United States Patent
vom Stein

(10) Patent No.: US 7,316,214 B2
(45) Date of Patent: Jan. 8, 2008

(54) COVER FOR TIGHTLY SEALING A DEVICE

(75) Inventor: Hans-Joachim vom Stein, Odenthal (DE)

(73) Assignee: AB SKF, Gothenburg (SE)

(*) Notice: Subject to any disclaimer, the term of this patent is extended or adjusted under 35 U.S.C. 154(b) by 96 days.

(21) Appl. No.: 11/068,886

(22) Filed: Mar. 2, 2005

(65) Prior Publication Data
US 2005/0205033 A1 Sep. 22, 2005

(30) Foreign Application Priority Data
Mar. 2, 2004 (DE) .................. 10 2004 010 584

(51) Int. Cl.
F01M 9/10 (2006.01)
(52) U.S. Cl. .................. 123/90.37; 123/90.38; 123/193.3
(58) Field of Classification Search ........ 123/90.37, 123/90.38, 198 E, 198 F, 193.3
See application file for complete search history.

(56) References Cited

U.S. PATENT DOCUMENTS

| 4,499,869 A | 2/1985 | Visek | |
|---|---|---|---|
| 5,957,100 A * | 9/1999 | Frohwerk et al. | 123/90.38 |
| 6,691,667 B2 * | 2/2004 | Salameh | 123/195 C |
| 2002/0170775 A1 | 11/2002 | Vom Stein et al. | |

FOREIGN PATENT DOCUMENTS

| DE | 1 601 380 | 1/1971 |
|---|---|---|
| DE | 20 51 346 | 6/1971 |
| DE | 26 38 982 A1 | 3/1978 |
| DE | 34 04 043 A1 | 8/1984 |
| DE | 101 19 892 C2 | 11/2002 |
| GB | 1 303 478 | 1/1973 |
| GB | 2328990 A * | 3/1999 |

OTHER PUBLICATIONS

German Office Action issued by the German Patent Office on Dec. 15, 2004 (with English translation). (Copies of the cited references have been filed on Mar. 2, 2005).

* cited by examiner

*Primary Examiner*—Ching Chang
(74) *Attorney, Agent, or Firm*—Buchanan, Ingersoll & Rooney PC

(57) ABSTRACT

A cover for tightly sealing a device comprises at least one elastomer part which is designed to fit tightly against a contact surface of a device, and another part which follows the elastomer part, with the elastomer part being arc-shaped in a transition area to the other part.

15 Claims, 2 Drawing Sheets